US 6,707,209 B2

(12) United States Patent
Crapo et al.

(10) Patent No.: US 6,707,209 B2
(45) Date of Patent: Mar. 16, 2004

(54) REDUCED COGGING TORQUE PERMANENT MAGNET ELECTRIC MACHINE WITH ROTOR HAVING OFFSET SECTIONS

(75) Inventors: Alan D. Crapo, Florissant, MO (US); Todd A. Walls, Rock Hill, MO (US); Richard E. Hartsfield, Jr., Chesterfield, MO (US); Charles P. Ketterer, Fenton, MO (US); Ken De Luca, O'Fallon, IL (US)

(73) Assignee: Emerson Electric Co., St. Louis, MO (US)

( * ) Notice: Subject to any disclaimer, the term of this patent is extended or adjusted under 35 U.S.C. 154(b) by 80 days.

(21) Appl. No.: 09/851,865

(22) Filed: May 9, 2001

(65) Prior Publication Data

US 2002/0067092 A1 Jun. 6, 2002

Related U.S. Application Data

(60) Provisional application No. 60/251,181, filed on Dec. 4, 2000.

(51) Int. Cl.[7] .......................... H02K 1/27; H02K 21/12; H02K 21/26; H02K 21/38; H02K 21/04
(52) U.S. Cl. ........................ 310/156.43; 310/156.45; 310/156.47; 310/156.38; 310/156.01; 310/154.29; 310/154.21; 310/154.17; 310/154.11; 310/154.01
(58) Field of Search ........................ 310/156.01, 156.38, 310/156.43, 156.45, 156.47, 154.01, 154.11, 154.17, 154.21

(56) References Cited

U.S. PATENT DOCUMENTS

| 606,912 A | * | 7/1898 | Bláthy et al. | 318/494 |
| 2,435,911 A | * | 2/1948 | Van Der Woude | 310/163 |
| 3,979,821 A | | 9/1976 | Noodleman | 29/578 |
| 4,562,399 A | * | 12/1985 | Fisher | 322/94 |

(List continued on next page.)

FOREIGN PATENT DOCUMENTS

| EP | 300042 | 1/1989 |
| EP | 0392028 | 10/1990 |
| EP | 0449538 A1 | 10/1991 |
| EP | 0483372 A1 | 5/1992 |

(List continued on next page.)

OTHER PUBLICATIONS

Nicola Bianchi, Silverio Bolognani; "Design Techniques for Reducing the Cogging Torque in Surface–Mounted PM Motors"; Department of Electrical Engineering, University of Padova.

Ackermann/Janssen/Sottek/van Steen, "XP–002209198 New technique for reducing cogging torque in class of brushless DC Motors", IEEE Proceeding–B, vol. 139, No. 4 Jul. 1992, pp. 315–320.

(List continued on next page.)

Primary Examiner—Karl Tamai
Assistant Examiner—Pedro J. Cuevas
(74) Attorney, Agent, or Firm—Harness, Dickey & Pierce, P.L.C.

(57) ABSTRACT

A permanent magnet electric machine with reduced cogging torque includes a plurality of axial rotor sections that are defined on a radially outer surface of a rotor. The axial rotor sections include a set of permanent magnets that are in an unmagnetized state and that have opposite edges that are aligned with an axis of the rotor. The axial rotor sections are rotationally offset such that the edges of the permanent magnets create stair step interfaces. The n sets of permanent magnets are magnetized using a magnetizing fixture. The permanent magnets have a generally rectangular shape and are preferably arc magnets or breadloaf magnets. The conductors of the magnetizing fixture are aligned with the stair step interfaces. A magnetic field induced in the permanent magnets is substantially reduced along the stair step interfaces.

18 Claims, 8 Drawing Sheets

U.S. PATENT DOCUMENTS

| | | | | |
|---|---|---|---|---|
| 4,642,502 A | * | 2/1987 | Carpenter et al. | 310/156.12 |
| 4,700,098 A | | 10/1987 | Kawashima | 310/186 |
| 4,714,852 A | * | 12/1987 | Kawada et al. | 310/156.38 |
| 4,739,203 A | | 4/1988 | Miyao et al. | 310/67 R |
| 4,782,259 A | * | 11/1988 | Shikama et al. | 310/156.47 |
| 4,845,837 A | | 7/1989 | Lloyd | 29/598 |
| 4,868,438 A | * | 9/1989 | Okamoto et al. | 310/166 |
| 4,871,934 A | * | 10/1989 | Okamoto et al. | 310/166 |
| 4,933,584 A | * | 6/1990 | Harms et al. | 310/162 |
| 4,953,284 A | | 9/1990 | Hammer et al. | 29/596 |
| 4,954,739 A | * | 9/1990 | Schultz et al. | 310/156.43 |
| 4,987,329 A | * | 1/1991 | Schmidt et al. | 310/156.43 |
| 5,006,745 A | | 4/1991 | Nishio et al. | 310/177 |
| 5,034,642 A | | 7/1991 | Hoemann et al. | 310/156 |
| 5,093,595 A | * | 3/1992 | Korbel | 310/156.43 |
| 5,164,622 A | | 11/1992 | Kordik | 310/67 R |
| 5,250,867 A | | 10/1993 | Gizaw | 310/179 |
| 5,302,876 A | * | 4/1994 | Iwamatsu et al. | 310/156.12 |
| 5,388,658 A | | 2/1995 | Ando et al. | 180/197 |
| 5,397,951 A | * | 3/1995 | Uchida et al. | 310/156.21 |
| 5,563,463 A | | 10/1996 | Stark | 310/156 |
| 5,610,464 A | | 3/1997 | Asano et al. | 310/156 |
| 5,753,991 A | | 5/1998 | Couture et al. | 310/156 |
| 5,886,440 A | | 3/1999 | Hasebe et al. | 310/156 |
| 5,982,067 A | | 11/1999 | Sebastian et al. | 310/184 |
| 6,031,304 A | | 2/2000 | Suzuki et al. | 310/49 R |
| 6,034,459 A | | 3/2000 | Matsunobu et al. | 310/156 |
| 6,034,460 A | | 3/2000 | Tajima et al. | 310/179 |
| 6,040,647 A | | 3/2000 | Brown et al. | 310/89 |
| 6,049,153 A | * | 4/2000 | Nishiyama et al. | 310/156.53 |
| 6,104,117 A | * | 8/2000 | Nakamura et al. | 310/254 |
| 6,140,728 A | | 10/2000 | Tomita et al. | 310/156 |
| 6,262,507 B1 | | 7/2001 | Sato et al. | 310/152 |
| 6,384,503 B1 | * | 5/2002 | Iwaki et al. | 310/156.47 |
| 6,388,353 B1 | * | 5/2002 | Liu et al. | 310/156.09 |
| 6,462,452 B2 | * | 10/2002 | Nakano et al. | 310/156.47 |

FOREIGN PATENT DOCUMENTS

| | | | | |
|---|---|---|---|---|
| EP | 0564759 A1 | | 10/1993 | |
| JP | 60013455 | | 1/1985 | |
| JP | 60170455 A | * | 9/1985 | H02K/29/00 |
| JP | 61199446 | | 3/1986 | |
| JP | 61199447 | | 9/1986 | |
| JP | 63140645 | | 6/1988 | |
| JP | 04255440 A | * | 9/1992 | H02K/1/27 |
| JP | 06038415 A | * | 2/1994 | H02K/1/27 |

OTHER PUBLICATIONS

Chen/Bruhl, "XP–000833296 The Robust Design Approach For Reducing Cogging Torque In Permanent Magnet Motors", IEEE Transactions on Magnetics, vol. 34, No. 4, Jul. 1998, pp. 2135–2137.

Zhu/Howe, "XP–002206342 Influence of Design Parameters on Cogging Torque in Permanent Magnet Machines", IEEE Transactions on Energy Conversion, vol. 15, No. 4, Dec. 2000, pp. 407–412.

* cited by examiner

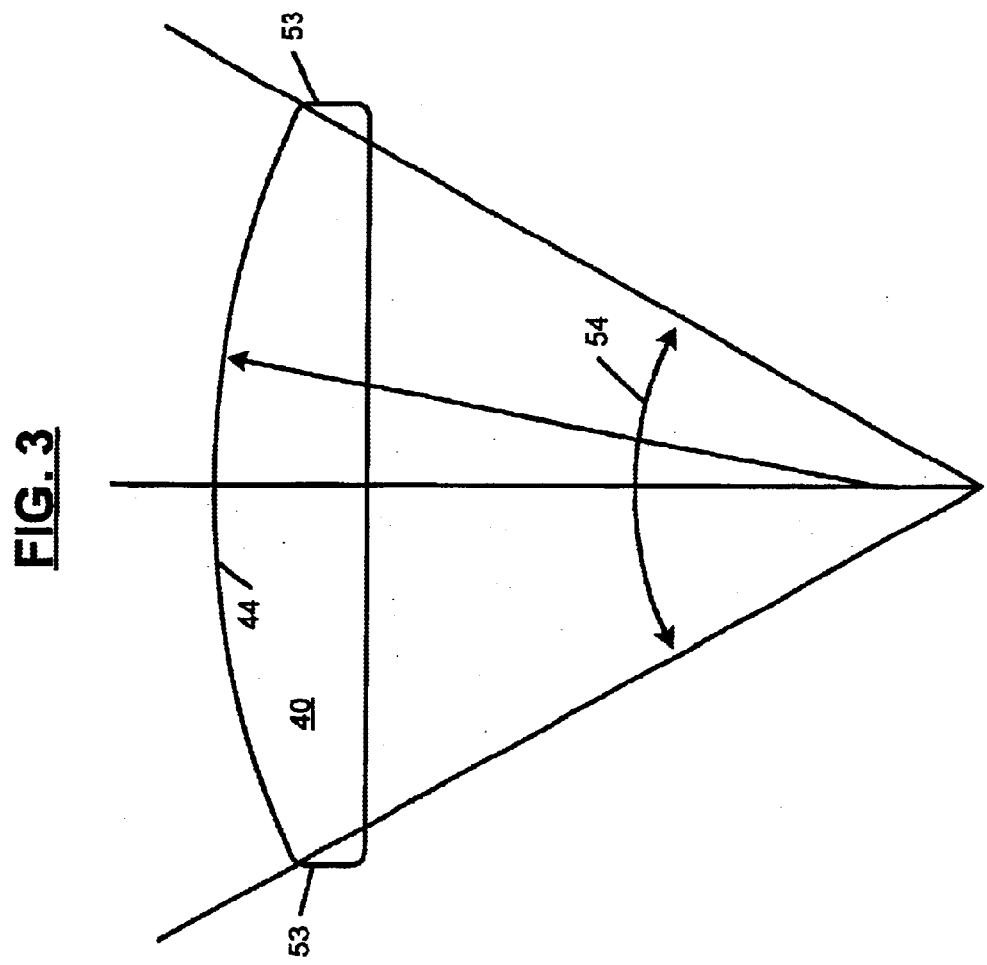
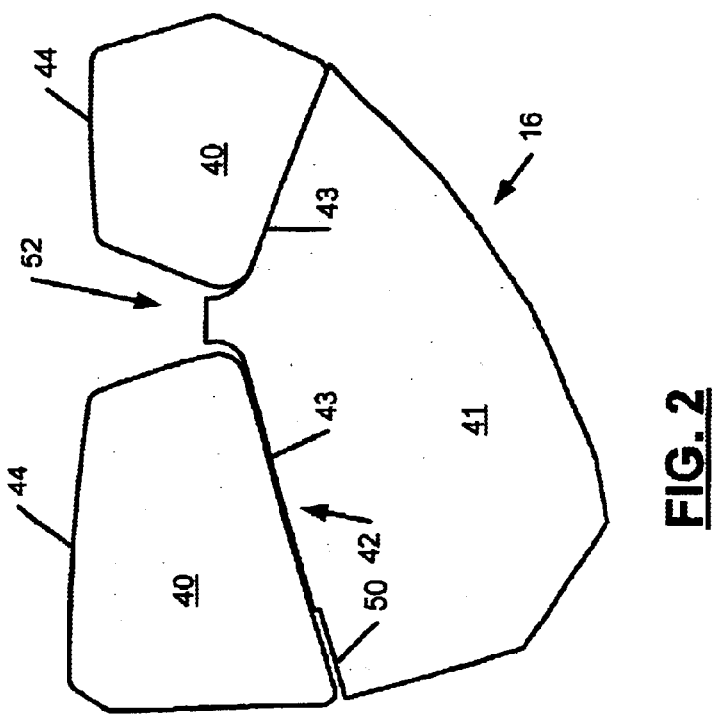

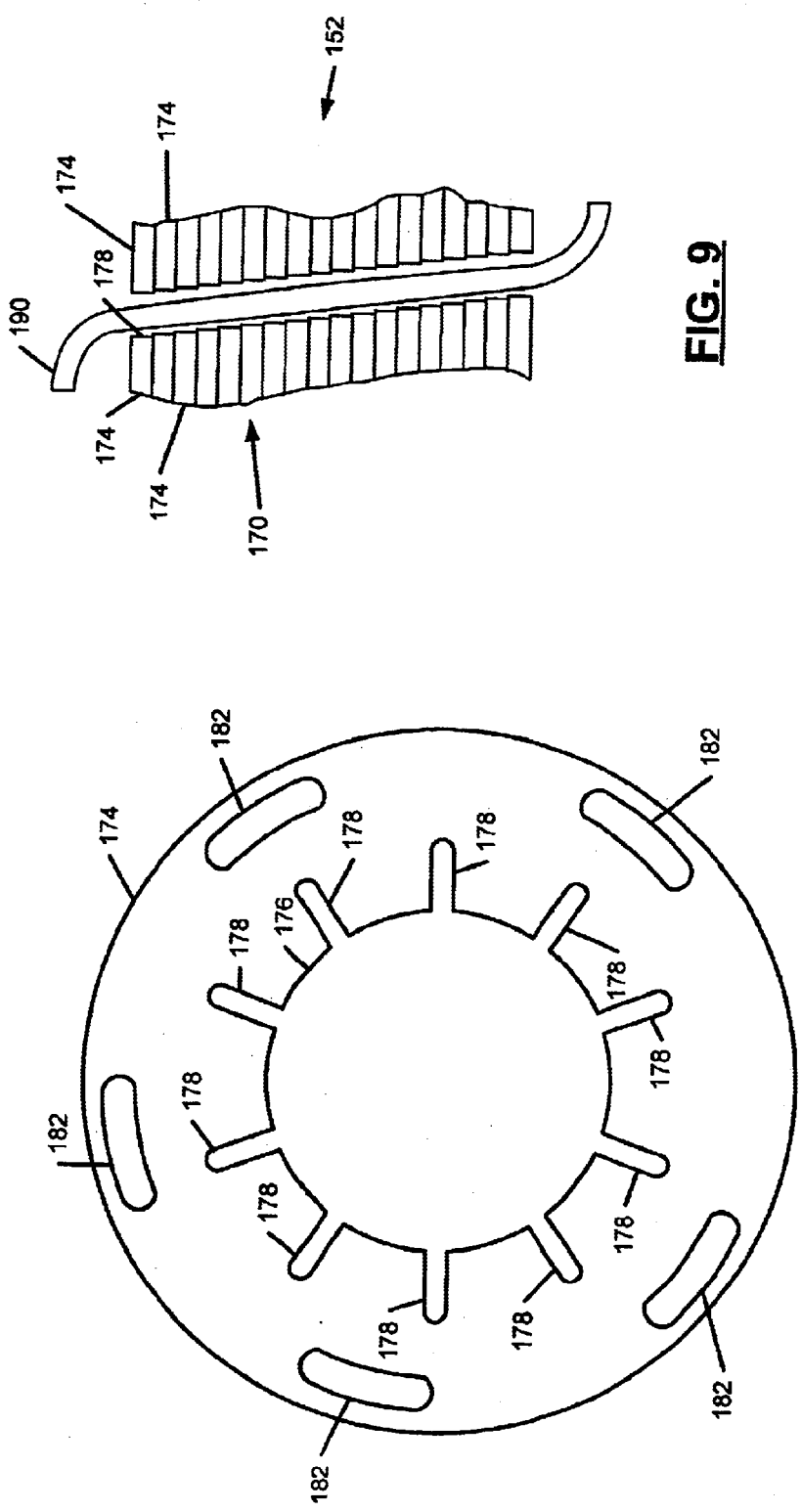
FIG. 8
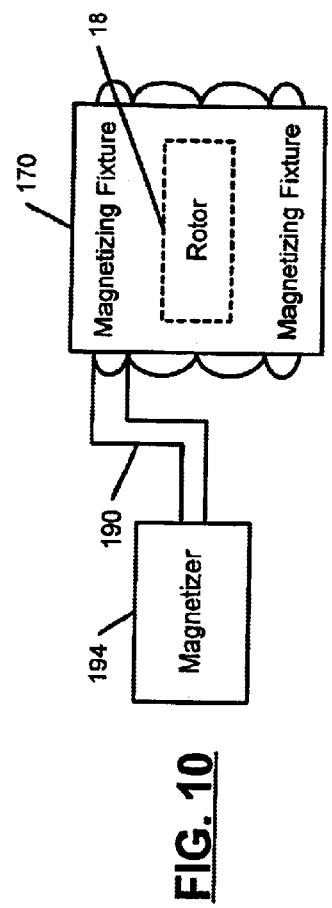
FIG. 9
FIG. 10

REDUCED COGGING TORQUE PERMANENT MAGNET ELECTRIC MACHINE WITH ROTOR HAVING OFFSET SECTIONS

This application claims the benefit of provisional application No. 60/251,181 filed Dec. 4, 2000.

FIELD OF THE INVENTION

This invention relates to permanent magnet electric machines, and more particularly to permanent magnet electric machines having two or more axial rotor sections that are rotationally offset.

BACKGROUND OF THE INVENTION

Permanent magnet electric machines, such as motors and generators, include a stationary stator that defines salient poles and inter-polar slots that are located between the salient poles. The stator is often mounted on an inner surface of a machine housing with the salient poles projecting radially inwardly. The permanent magnet electric machines also include a rotor that is mounted on a shaft, that includes rotor poles and that rotates on the shaft relative to the stator. The rotor poles include permanent magnets that are attached to a radially outer surface of the rotor. Winding wire is wound around the stator poles in the inter-polar stator slots. A circuit board or another connection device couples the stator pole windings to a drive circuit. The drive circuit generates a set of stator winding currents that are output to the stator pole windings and that result in a rotating magnetic field. The rotating magnetic field in the stator poles interacts with the magnetic poles of the rotor to cause the rotor to rotate.

Electric machines with permanent magnet rotors often have cogging torque that adversely impacts machine performance. Cogging torque is caused by the variation of magnetic permeance as seen by a rotor pole as it passes the stator poles and the slot openings. Cogging torque occurs when the stator windings are un-energized. The rotor seeks a rotational position that results in the lowest magnetic circuit reluctance (or the highest permeance). The rotational position with the lowest magnetic circuit reluctance occurs when a rotor pole is aligned with a stator pole. When the rotor pole is aligned with a slot opening, the rotor pole will attempt to align itself with a stator pole, thereby producing torque. The cogging torque oscillates between positive and negative torque, depending on the position of the rotor poles with respect to the stator poles. The torque oscillations cause vibration and noise within the permanent magnet electric machine. The variation in torque can also cause vibration in the equipment that is driven by the machine, which causes additional noise.

Various methods for reducing cogging torque have been proposed. In one method, the permanent magnets are skewed in an angled pattern or in a herringbone pattern on the outer surface of the rotor. Skewing the permanent magnets increases material and manufacturing costs due to the complex and non-uniform shape of the permanent magnets. The non-uniform permanent magnets are also difficult to assemble.

Therefore, a permanent magnet electric machine that significantly reduces cogging torque and that can be assembled relatively easily and with relatively low manufacturing costs would be desirable.

SUMMARY OF THE INVENTION

A permanent magnet electric machine according to the invention includes a plurality of axial rotor sections that are defined on a radially outer surface of a rotor. The axial rotor sections include a set of permanent magnets that are in an unmagnetized state and that have opposite edges that are aligned with an axis of the rotor. The axial rotor sections are rotationally offset such that the edges of the permanent magnets create interfaces. The permanent magnets are magnetized using a magnetizing fixture.

In other features of the invention, the permanent magnets have a generally rectangular shape and are preferably one of arc magnets and breadloaf magnets. A first offset angle of the axial rotor sections is substantially equal to 360 mechanical degrees divided by a least common multiple of a first number of stator slots of the machine and a second number of rotor poles of the rotor, and divided by a third number of axial rotor sections.

In still other features of the invention, the sets of permanent magnets include m magnet poles and the magnetizing fixture includes at least m slots for conductors. A skew angle of the magnetizing fixture is substantially equal to 360 mechanical degrees divided by the least common multiple of the first number and the second number, multiplied by a stack length of the magnetizing fixture, and divided by a stack length of the rotor.

In still other features, the m conductor slots of the magnetizing fixture are aligned with the interfaces during magnetization. A magnetic field impressed upon the permanent magnets is substantially reduced along the stair step interfaces.

Other objects, features and advantages will be apparent from the specification, the drawings and the claims that follow.

BRIEF DESCRIPTION OF THE DRAWINGS

FIG. 2 illustrates a partial view of the rotor between two adjacent permanent magnets;

FIG. 3 is a side view of a permanent magnet that illustrates a crown radius and a magnet dimension angle according to the present invention;

FIG. 8 illustrates a lamination used in the magnetizing fixture;

FIG. 9 is a partial view illustrating a conductor that is located in a slotted groove that is provided by the magnetizing fixture;

FIG. 10 is a functional block diagram of a magnetizer that is connected to a conductor of a magnetizing fixture and a rotor that is located in a central bore of the magnetizing fixture.

DETAILED DESCRIPTION OF THE PREFERRED EMBODIMENTS

The ensuing detailed description provides preferred exemplary embodiments only and is not intended to limit the scope, applicability or configuration of the present invention. Rather, the ensuing detailed description of the preferred exemplary embodiments will provide those skilled in the art with an enabling description for implementing the preferred exemplary embodiments of the present invention. It being understood that various changes may be made in the function and arrangement of the elements without departing from the spirit and scope of the invention as set forth in the appended claims.

The permanent magnet electric machine described herein dramatically reduces and/or eliminates cogging torque by providing a rotor with two or more axial rotor sections. The axial rotor sections are rotationally offset by an offset angle that is equal to the cogging angle divided by the number of axial rotor sections. The axial rotor sections have optimized dimensions that produce symmetric, periodic cogging torque waveforms that substantially cancel each other due to the offset angle of the axial rotor sections. The optimized dimensions are defined by an air-gap ratio, a slot-opening ratio and a magnet dimension angle that will be described further below. The permanent magnet electric machine provides a significant reduction in the composite cogging torque waveform. A novel method of assembling the rotor with two or more axial rotor sections that are offset at the offset angle is also disclosed. The novel method eliminates the handling of magnetized parts, which simplifies the assembly process. To that end, the axial rotor sections are assembled with unmagnetized permanent magnets. The rotor is positioned in a magnetizing fixture and the permanent magnets are magnetized. A novel stacking fixture for positioning laminations of the magnetizing fixture is disclosed.

Figure 1:
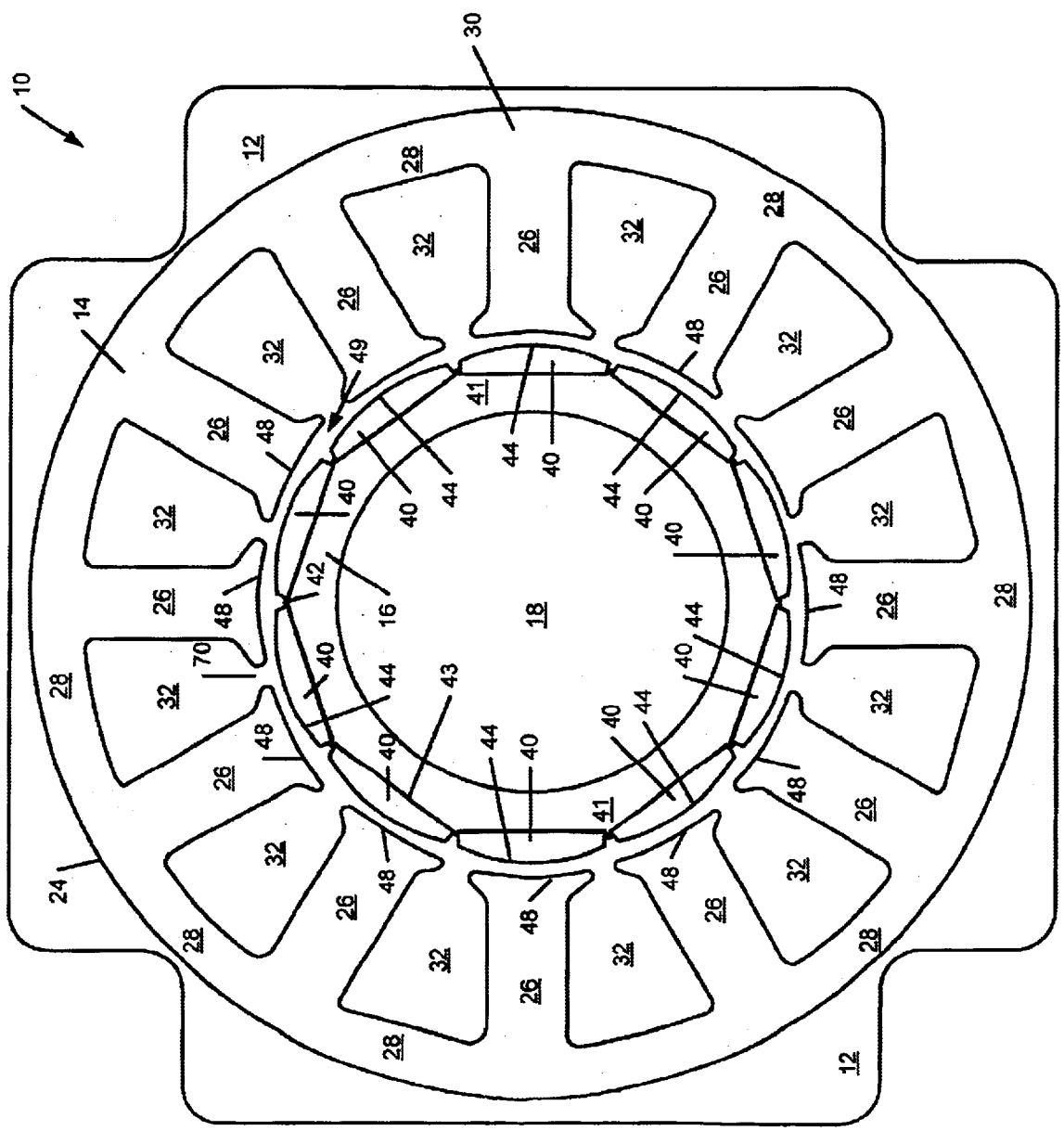
FIG. 1 illustrates a housing, a stator, a rotor and permanent magnets of a permanent magnet electric machine according to present invention.

Referring now to FIG. 1, an electric machine 10 is illustrated and includes a housing 12, a stator 14, a rotor 16, and a shaft 18. The stator 14 is mounted on an inner surface 24 of the housing 12. The stator 14 includes a plurality of stator poles 26 that project radially inwardly from an outer rim 28 of the stator 14. The stator 14 includes a stator core with a stack of stator plates that are interconnected in any suitable manner. Alternately, the stator core can be solid. While an un-segmented stator 14 is shown, a segmented stator can also be employed. One or more pairs of slits (not shown) are made in the stator plates when they are die cut. After the stator plates are stacked, a punch is used to deform a central portion between the slits. The deformed central portion holds the stack of stator plates together. Alternately, the stack of stator plates can be connected together using adhesives or any other suitable method.

The housing 12 and the stator 14 are assembled using press fit, hot drop or other suitable methods. In the hot drop method, the housing 12 is heated and expanded. The stator 14 is positioned using a fixture and the housing is "hot dropped" onto the stator 14. As the housing 12 cools, it contracts to provide an interference fit with the stator 14. In the press fit method, the stator 14 is positioned on the fixture and the housing 12 is press fit over the stator 14.

In FIG. 1, an outermost stator plate 30 of the stack is illustrated. The remaining stator plates 30 of the stack have a similar configuration as the outermost stator plate 30. Inter-pole stator slots 32 are located between adjacent stator poles 26. While not shown in FIG. 1, the stator 14 also includes winding wire that is wound around the stator poles 26 (using needle winding, transfer winding, computer numerical control (CNC) winding or other suitable winding methods) in the inter-pole stator slots 32. Opposite ends of the winding wire are connected to terminals that, in turn, are connected to the drive circuit. The terminals can be connected to end caps (not shown) that are connected on opposite face surfaces of the stack of stator plates. Alternately, the opposite ends of the winding wire can be connected directly to the drive circuit without the end caps and the terminals. Insulating material can also be positioned between the winding wire and the stator poles 26 and on outer surface of the winding wire on adjacent stator poles 26 in a conventional manner.

As will be described further below in conjunction with FIGS. 1, 2, 3, 4, 5A and 5B, the rotor 16 includes two or more axial rotor sections that are rotationally offset by an offset angle that is equal to the cogging angle divided by the number of axial rotor sections. The rotor 16 includes a rim section 41 and a radially outer surface 42 that includes magnet attachment surfaces 43 that may include grooves for receiving adhesive. Permanent magnets 40 are preferably adhered to the magnet attachment surfaces 43 on the radially outer surface 42 of the rotor 16. The permanent magnets 40 are assembled in an unmagnetized state. The permanent magnets 40 are preferably made of Ferrite, Neodymium Iron and Boron, or Summarium Cobalt. Other methods of attachment may also be employed. A radially outer crown surface 44 of the permanent magnets 40 and a radially inner surface 48 of the stator poles 26 define an air gap 49.

In the embodiment in FIG. 1, the stator 14 has twelve stator slots 32 (or stator poles 26) and the rotor 16 has ten rotor poles (or permanent magnets 40) in first and second axial rotor sections. In this embodiment, the stator has an outer diameter of 101.7 mm. A radially inner surface of the outer rim 28 has a diameter of 91.5 mm. The stator poles 26 have a width of 8.2 mm. The stator poles 26 are spaced at 30 degree intervals. The radially inner surface 48 of the stator poles 26 has a diameter of 55.5 mm. The stator slot opening 70 is 2.2 mm.

Referring now to FIG. 2, details relating to the attachment of the permanent magnets 40 to the rotor 16 are illustrated in further detail. The magnet attachment surfaces 43 include a groove 50 in the magnet attachment surfaces 43 for receiving adhesive to attach the permanent magnets 40 to the radially outer surface 42 of the rotor 16. The radially outer surface 42 of the rotor 16 includes a projection 52 that is located between the adjacent magnet attachment surfaces 43. Referring now to FIG. 3, the permanent magnets 40 have a bread loaf shape. In one embodiment, the permanent magnets 40 have a thickness of 3.0 mm, a length of 21.0 mm, and a width of 15.1 mm. The radially outer crown surface 44 preferably has a radius of 19.0 mm. Opposite lateral edges 53 of the permanent magnets 40 have a thickness of 1.4 mm.

The permanent magnets 40 according to the present invention have a magnet dimension angle that is identified at 54. The magnet dimension angle 54 is measured from a center of the rotor 16 to the opposite lateral edges 53 of the radially outer crown surface 44 of the permanent magnets 40. The magnet dimension angle 54 according to the invention is preferably between 31 and 35 degrees for the electric machine 10 with the 12/10 slot/pole combination. In a preferred embodiment, the magnet dimension angle 54 is approximately 33 degrees.

Figure 4:
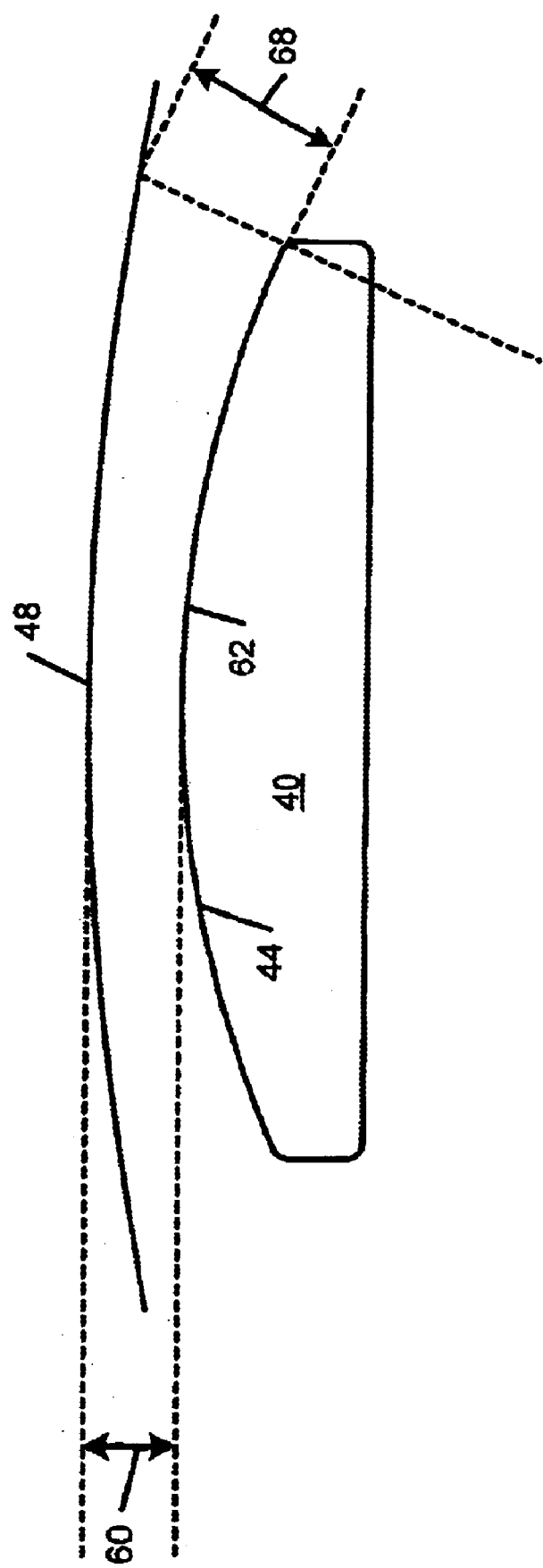
FIG. 4 is a view that is similar to FIG. 3 and that illustrates a center gap and an edge gap of the permanent magnet of FIG. 3.

Referring now to FIG. 4, a center gap is identified at 60. The center gap 60 is a minimum distance between a peak 62 of the radially outer crown surface 44 of the permanent magnet 40 and the radially inner surface 48 of the stator 14.

An edge gap is identified at 68. The edge gap 68 is defined as a distance between the outer lateral edge 53 of the radially outer crown surface 44 of the permanent magnet 40 and the radially inner surface 48 (or inner diameter) of the stator 14 taken along a radial line of the rotor. An air-gap ratio is defined as the edge gap 68 divided by the center gap 60. Preferably the air-gap ratio is between 1.35 and 2.5.

A slot opening ratio is defined as the width of the stator slot opening 70 divided by the edge gap 68. The slot opening ratio is preferably set approximately less than or equal to one. When the width of the stator slot opening 70 is wider than the edge gap 68, the electric machine 10 will produce a cogging torque with a relatively high magnitude.

Figure 5B:
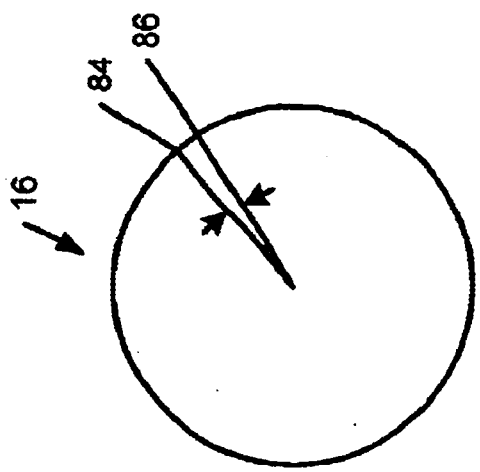
FIG. 5B illustrates a rotational offset angle of the permanent magnets illustrated in FIG. 5A.
Figure 5A:
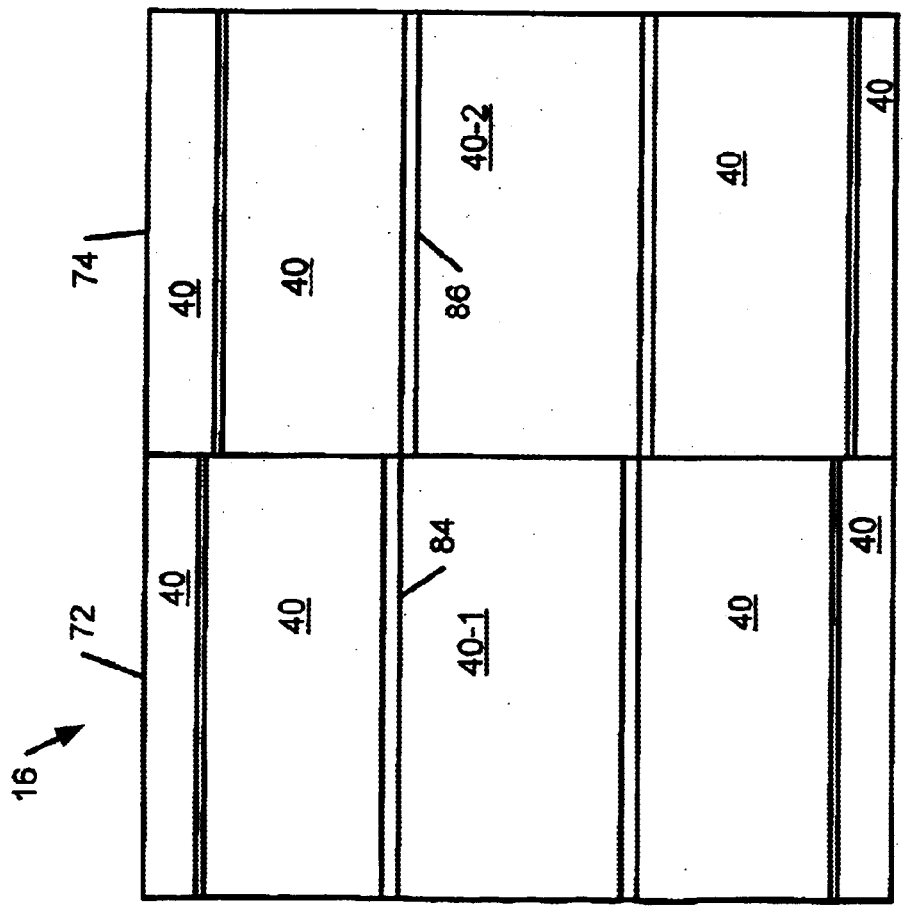
FIG. 5A illustrates first and second axial rotor sections of the rotor of FIG. 1.

Referring now to FIG. 5A, the rotor 16 includes two or more axial rotor sections. In FIG. 5A, two axial rotor sections are shown. First and second axial rotor sections 72 and 74 are rotationally offset by one half of the cogging angle. The cogging angle is substantially equal to the least common multiple of the number of stator slots and the number of rotor poles. In this case, the least common multiple of 12 and 10 is 60. 360 degrees divided by 60 is approximately 6 degrees. A mechanical rotational offset angle of approximately 3 degrees provides 180 (electrical) degree cancellation of the sinusoidal cogging torque waveforms. If additional rotor sections are employed, the offset angle for all of the axial rotor sections is substantially equal to the cogging angle divided by the number of axial rotor sections. The rotational offset angle is approximately 2 degrees if three axial rotor sections are employed. An edge 84 of the permanent magnet 40-1 of the axial rotor section 72 is rotationally offset by the offset angle from an edge 86 of the permanent magnet 40-2 of the axial rotor section 74 as is illustrated in FIG. 5B.

Figure 6:
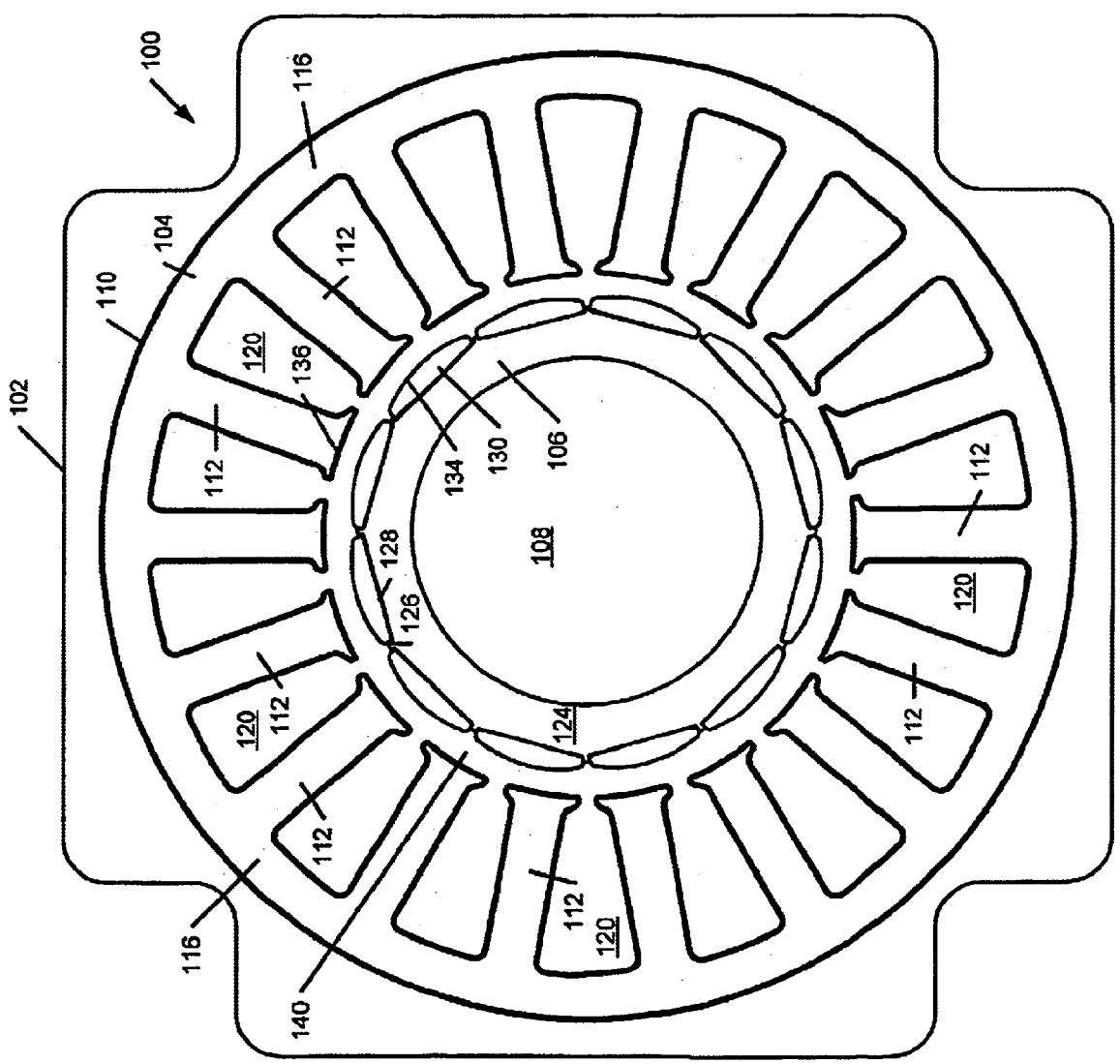
FIG. 6 illustrates a housing, a stator, a rotor and permanent magnets of an alternate permanent magnet electric machine according to present invention.

Referring now to FIG. 6, an alternate electric machine 100 is illustrated and includes a housing 102, a stator 104, a rotor 106, and a shaft 108. The alternate electric machine 100 has a construction that is similar to the electric machine 10 that is illustrated in FIG. 1. The stator 104 is mounted on an inner surface 110 of the housing 102. The stator poles 112 project radially inwardly from an outer rim 116 of the stator 104. The stator 104 includes a stack of interconnected stator plates. Inter-polar stator slots 120 are located between adjacent stator poles 112.

The rotor 106 includes two or more axial rotor sections similar to those shown in FIG. 5A. The axial rotor sections are rotationally offset by an offset angle that is equal to the cogging angle divided by the number of axial rotor sections. The rotor 106 includes an inner rim 124 and a radially outer surface 126 that includes magnet attachment surfaces 128. The magnet attachment surfaces 128 include grooves for receiving adhesive. Permanent magnets 130 are preferably adhered to the magnet attachment surfaces 128 on the radially outer surface 126 of the rotor 106. Other attachment methods may also be employed. A radially outer crown surface 134 of the permanent magnets 130 and a radially inner surface 136 of the stator poles 112 define an air gap 140.

In the embodiment illustrated in FIG. 6, the stator 104 includes eighteen stator slots 120 (or stator poles 112) and twelve rotor poles (or permanent magnets 130) in first and second axial rotor sections. The stator has an outer diameter of 101.7 mm. A radially inner surface of the outer rim 116 has a diameter of 92.2 mm. The stator teeth have width of 5.2 mm. The stator teeth are spaced at 20 degree intervals. The radially inner surface 136 of the stator poles 26 has a diameter of 55.5 mm. The stator slot opening 70 is 2.0 mm.

The magnet dimension angle is preferably between 25 and 28 degrees. The air-gap ratio is between 1.35 and 2.5. The slot-opening ratio is less than or equal to 1.0.

The permanent magnets 130 have a thickness of 3.0 mm, a length of 26.5 mm, and a width of 10.7 to 11.7 mm. The radially outer crown surface preferably has a radius of 14.0 to 19.0 mm. Opposite lateral edges of the permanent magnets have a thickness of 1.8 mm to 2.2 mm. In this embodiment, the cogging angle is 10 degrees since the least common multiple of 18 and 12 is 36, and 360 degrees divided by 36 is 10 degrees. A mechanical rotational offset angle of approximately 5 degrees provides cancellation of the cogging torque waveforms that are associated with the first and second axial rotor sections. The rotational offset angle would be approximately 3.33 degrees if three axial rotor sections are employed.

The dimensions of the stator 14 and 104, the rotor 16 and 106, and the permanent magnets 40 and 130 have been selected such that the cogging torque waveforms that are generated by the axial rotor sections approach a periodic waveform. By rotationally offsetting the axial rotor sections by an offset angle equal to the cogging angle divided by the number of axial rotor sections, the cogging torque waveforms of the axial rotor sections substantially cancel and the cogging torque can be reduced significantly. While both of the permanent magnet electric machines 10 and 100 include first and second axial rotor sections, additional axial rotor sections can be added and rotationally offset in the manner described herein. In addition, the permanent magnets have a far less complex shape than skewed or herringbone permanent magnets, which reduces manufacturing complexity and material and assembling costs.

As is described above, there are significant advantages in providing the permanent magnet electric machine with two or more offset rotor sections. By dividing the rotor axially into two or more axial rotor sections and rotationally offsetting the axial rotor sections, the cogging torque can theoretically be eliminated. The axial rotor sections must be assembled on the rotor assembly with the proper offset angle with precision (e.g. within several mechanical degrees) to eliminate the cogging torque. In conventional rotor assembly methods, the permanent magnets are attached to the rotor core in an unmagnetized state. Subsequently, a magnetizing fixture is used to magnetize the permanent magnets. When two or more axial rotor sections are employed, they can be magnetized individually and then assembled. This manufacturing process is time-consuming and difficult to use in production due to the handling of magnetized parts.

Figure 7A:
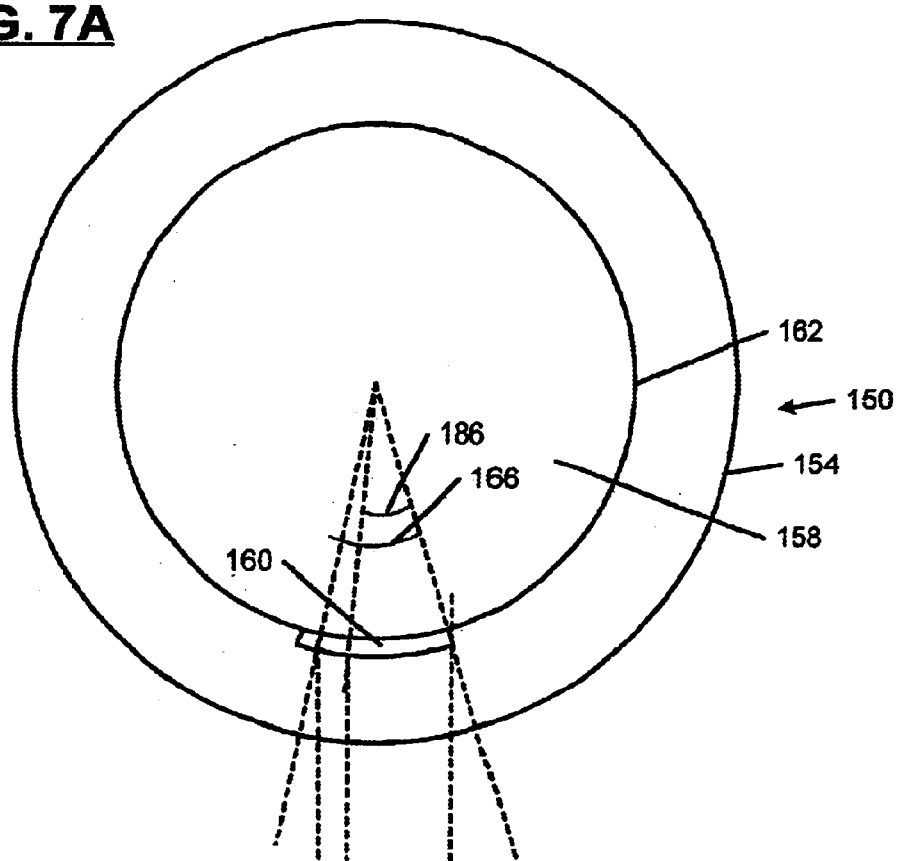
FIG. 7A is a plan view illustrating a stacking fixture.
Figure 7B:
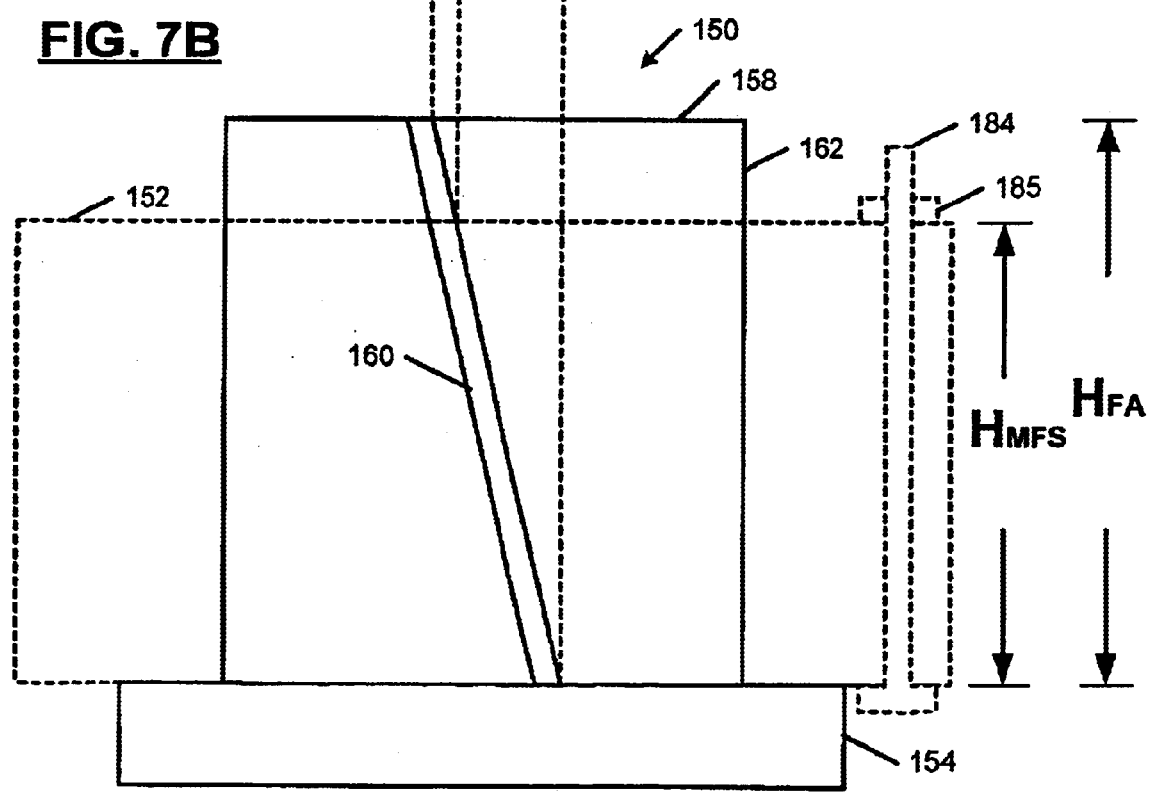
FIG. 7B is a side view of the stacking fixture of FIG. 7A and a magnetizing fixture.

Referring now to FIGS. 7A, 7B and 8, a stacking fixture 150 that is used to assemble a magnetizing fixture 152 is shown. The stacking fixture 150 includes a fixture base 154 and a fixture arbor 158. A fixture key 160 is connected to a radially outer surface 162 of the fixture arbor 158. The fixture key 160 is positioned at a fixture offset angle that is identified at 166. The fixture offset angle is measured relative to a line that runs parallel to the radially outer surface 162. The magnetizing fixture 152 preferably includes a plurality of laminations 174 that define a center bore 176 that is slightly larger than the radially outer surface 162 of the fixture arbor 158. During magnetization, the rotor is positioned in the center bore 176. The center bore 176 includes a plurality of slotted grooves 178 that project in a radially outward direction from the center bore 176. The number of slotted grooves 178 is equal to the number of rotor poles.

The laminations 174 include slots 182 that receive a fastener such as a threaded bolt 184. A nut 185 is used to tighten the laminations 174 together after using the stacking fixture 150 to set a rotor skew angle. The rotor skew angle is approximately equal to the number of axial rotor sections (n) times the offset angle for each rotor section. The slots 182 are elongated sufficiently to accommodate a range of rotor skew angles that is to be employed. The individual laminations 174 of the magnetizing fixture 152 are positioned relative to one another using the stacking fixture 150. The laminations 174 can be connected together in other ways. The laminations 174 can be welded together, attached together using adhesive, or any other suitable method can be employed. Alternately, the magnetizing fixture 152 can include a solid core.

The rotor skew angle is identified at 186. If the height $H_{MFS}$ of the magnetizing fixture 152 is equal to the height $H_{FA}$ of the fixture arbor 158, the rotor skew angle is approximately equal to the fixture offset angle 166 of the fixture key 160. If not, the fixture offset angle 166 approximately equals the rotor skew angle multiplied by the height $H_{FA}$ of the fixture arbor 158 divided by the height $H_{MFS}$ of the magnetizing fixture 152. Preferably, the height $H_{FA}$ of the fixture arbor is greater than the height $H_{MFS}$ of the magnetizing fixture 152 to reduce end effects.

Referring now to FIG. 9, the slotted grooves 178 of the stack 170 of laminations 174 are shown. One or more conductors 190 are positioned in the slotted groove 178. In a preferred embodiment, the conductors 190 are wound from one slotted groove 178 to adjacent slotted grooves 178 in a repeating "S" pattern. While a single conductor 190 is shown, multiple conductors can be wound in the slotted grooves 178. Referring now to FIG. 10, a magnetizer 194 such as a capacitor discharge magnetizer generates a high current signal in the conductors 190 that magnetizes the permanent magnets 40 of the rotor 18. Preferably, the field strength of the magnetizer is between 10 and 35 kiloOersteds for a pulse width having a duration of a few milliseconds.

An exemplary rotor (such as the rotor in FIG. 1) includes ten rotor poles that are divided into two axial rotor sections. The offset angle for the two axial rotor sections is equal to three mechanical degrees when viewed from an end of the rotor core. The rotor skew angle 186 for magnetization is therefore approximately six degrees (three degrees offset angle multiplied by two axial rotor sections). In order to reduce end effects during magnetization, the magnetizing fixture height $H_{MFS}$ is preferably made longer than the rotor stack height. In a preferred embodiment, the rotor stack is 50 mm and the fixture arbor is 62 mm. Since the height $H_{FA}$ of the fixture arbor 158 is longer than the height $H_{MFS}$ of the magnetizing fixture 152, the fixture skew angle must be slightly greater than approximately 6 degrees. The fixture offset angle 166 is (6 degrees)*(50 mm+12 mm)/(50 mm), which is equal to approximately 7.44 degrees.

If the rotor diameter of the permanent magnets is 25 mm, the laminations 174 are preferably cut with an inside diameter of 25.7 mm. The laminations 174 include ten slotted grooves 178 that extend radially outward from the rotor. The fixture arbor 158 has an outside diameter of 25.55 mm. The fixture key 160 is slightly smaller than the width of the slotted grooves 178 and the laminations 174. The fixture key sweeps at an angle of 7.44 degrees over an axial distance that is equal to the height of the fixture arbor (62 mm). The laminations 174 are stacked on the stacking fixture 150 and then attached together. After the magnetizing fixture 152 is removed from the stacking fixture 150, the conductors 190 are placed in the slotted grooves 178. After winding of the conductors 190 is complete, the magnetizing fixture is ready for use.

The conductors 190 of the magnetizing fixture are connected to the magnetizer 194. A rotor is placed in the center bore 176. Pole boundaries of the rotor are aligned with the conductor slots in the fixture and the magnetizer 194 is turned on. The magnetizer 194 generates a magnetic field that magnetizes the permanent magnets.

Figure 11:
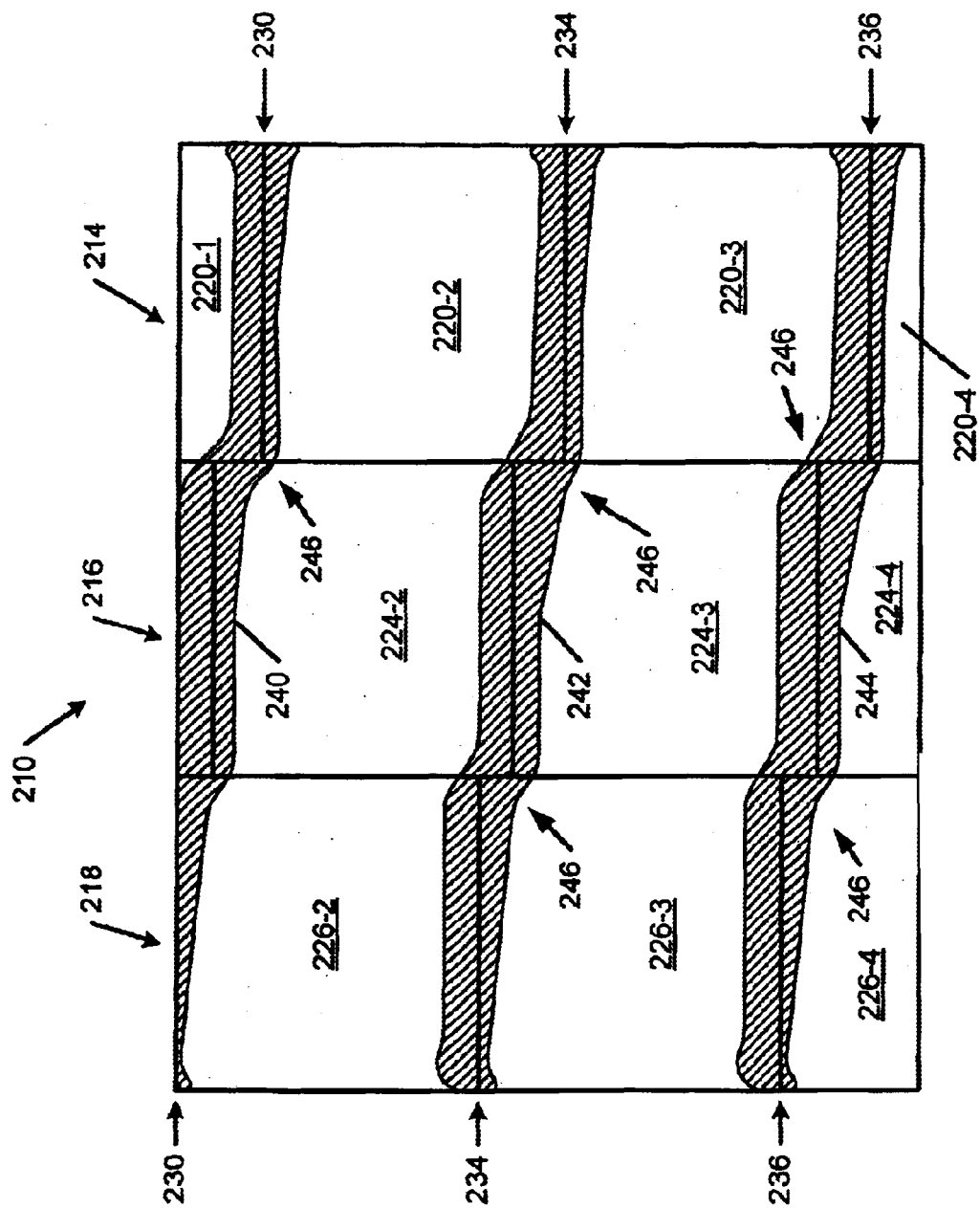
FIG. 11 is a plan view of a rotor illustrating a magnetization pattern of the permanent magnets after magnetization in the magnetizing fixture.

Referring now to FIG. 11, a plan view of a rotor 210 with three axial rotor sections 214, 216 and 218 is illustrated. The axial rotor sections are rotationally offset in a manner described above to reduce cogging torque. Permanent magnets 220-1, 220-2, . . . , 220-n of the axial rotor section 214 have a generally rectangular cross section or shape in a plan view. Likewise, permanent magnets 224-1, 224-2, . . . , 224-n of the axial rotor section 216 and permanent magnets 226-1, 226-2, . . . , 226-n of the axial rotor section 218 have a generally rectangular cross section or shape in a plan view. As best appreciated with reference to FIG. 11, interfaces 230, 234 and 236 are formed along the abutting edges or intersections of the permanent magnets 220, 224 and 226 and preferably have a stair step-like shape. During magnetization, the conductors 190 impress a magnetic field on the permanent magnets 220, 224 and 226. Substantially unmagnetized areas 240, 242 and 244 are formed adjacent to the conductors 190 where the conductors 190 are substantially parallel to the permanent magnets 220, 224 and 226. The magnetic field that is impressed in the permanent magnets increases from a minimum value adjacent to the conductor 190 to a maximum value approximately halfway between the two adjacent conductors 190. The magnetic field decreases from the maximum value (halfway between the two adjacent conductors) to a minimum value parallel to the adjacent conductor.

In a preferred embodiment, the conductor slots 178 and the conductors 190 are aligned with the interfaces 230, 234 and 236. As a result, the substantially unmagnetized areas 240, 242 and 244 are formed about the stair step interfaces 230, 234 and 236. When the conductors 190 are aligned with the interfaces 230, 234 and 236, the substantially unmagnetized areas 240, 242, 244 have a shape that is a combination of an unmagnetized straight skewed area due to the straight skew of the conductors 190 and an unmagnetized stair step area due to the inherently substantially unmagnetizable area about the interfaces 230, 234, and 236. When these two unmagnetized regions overlie one another, one skilled in the art can best appreciate that the resulting unmagnetized areas 240, 242 and 244 take on a stair step-like shape (due to the stair step interfaces 230, 234, 236) with the addition of an additional unmagnetized area near the corners 246 of the magnets 220, 224, 226 (due to the straight skew of each corresponding conductor 190) or a stair step shape with clipping near the corners 246. While the substantially unmagnetized skewed areas 240, 242 and 244 need not align with the stair step interfaces 230, 234 and 236, the permanent magnet material is utilized more effectively when they are aligned.

The substantially unmagnetized regions 240, 242, and 244 do not significantly increase the cogging torque when compared with rotors that are assembled with pre-magnetized permanent magnets. The simplification of the assembly process and the corresponding reduction in cost of manufacturing the present invention is substantial when compared with the manufacturing complexity and the cost of rotors that are assembled with pre-magnetized permanent magnets.

Those skilled in the art can now appreciate from the foregoing description that the broad teachings of the present invention can be implemented in a variety of forms.

Therefore, while this invention has been described in connection with particular examples thereof, the true scope of the invention should not be so limited since other modifications will become apparent to the skilled practitioner upon a study of the drawings, the specification and the following claims.

What is claimed is:

1. A permanent magnet electric machine with reduced cogging torque, comprising:
   a rotor; and
   a plurality of axial rotor sections defined on a radially outer surface of said rotor,
   wherein each of said axial rotor sections include a set of permanent magnets,
   wherein axial rotor sections are rotationally offset and said edges of said permanent magnets define stair step interfaces, and
   wherein said permanent magnets of said rotor include substantially unmagnetized straight skewed areas.

2. The permanent magnet electric machine of claim 1 wherein said substantially unmagnetized straight skewed areas align with said stair step interfaces.

3. The permanent magnet electric machine of claim 2 wherein said unmagnetized skewed areas have a stair step-like shape with clipping.

4. The permanent magnet electric machine of claim 1 wherein a first offset angle of said axial rotor sections is approximately equal to 360 mechanical degrees divided by a least common multiple of a first number of a stator slots of said machine and a second number of rotor poles of said rotor, and divided by a third number of said axial rotor segments.

5. The permanent magnet electric machine of claim 1 wherein each of said sets of permanent magnets include m magnet poles and a magnetizing fixture that is used to magnetize said permanent magnets after assembly includes at least m conductor slots.

6. The permanent magnet electric machine of claim 4 wherein a skew angle of a magnetizing fixture is approximately equal to 360 mechanical degrees divided by the least common multiple of said first number and said second number, multiplied by a stack length of said magnetizing fixture, and divided by a stack length of said rotor.

7. The permanent magnet electric machine of claim 1 wherein said permanent magnets are one of arc magnets and breadloaf magnets.

8. A permanent magnet electric machine with reduced cogging torque, comprising:
   a rotor; and
   a plurality of axial rotor sections defined on a radially outer surface of said rotor,
   wherein each of said axial rotor sections include a set of permanent magnets that are initially attached in an unmagnetized state and that have opposite edges that are aligned with an axis of said rotor,
   wherein said permanent magnets of said rotor include at least one substantially unmagnetized stair step area and at least one straight skewed unmagnetized area.

9. The permanent magnet electric machine of claim 8 wherein said unmagnetized stair step area and said unmagnetized straight skewed area overlie one another thus forming an unmagnetized area with clipping.

10. The permanent magnet electric machine of claim 1 wherein said permanent magnets are magnetized after assembly.

11. The permanent magnet electric machine of claim 1 wherein a magnetic field that is impressed in said permanent magnets increases from a minimum value adjacent to one stair step interface to a maximum value approximately halfway between said one stair step interface and an adjacent stair step interface.

12. The permanent magnet electric machine of claim 1 wherein said permanent magnets have a generally rectangular cross-section.

13. The permanent magnet electric machine of claim 8 wherein said permanent magnets have a generally rectangular cross-section.

14. The permanent magnet electric machine of claim 8 wherein a magnetic field that is impressed in said permanent magnets increases from a minimum value adjacent to one stair step interface to a maximum value approximately halfway between said one stair step interface and an adjacent stair step interface.

15. A permanent magnet electric machine with reduced cogging torque, comprising:
   a rotor; and
   a plurality of axial rotor sections defined on a radially outer surface of said rotor,
   wherein each of said axial rotor sections include a set of permanent magnets that are initially attached in an unmagnetized state and that have a generally rectangular cross-section,
   wherein said permanent magnets of said rotor include at least one substantially unmagnetized stair step area and at least one straight skewed unmagnetized area, and
   wherein a magnetic field that is impressed in said permanent magnets increases from a minimum value adjacent to one stair step interface to a maximum value approximately halfway between said one stair step interface and an adjacent stair step interface.

16. The permanent magnet electric machine of claim 15 wherein said substantially unmagnetized straight skewed areas align with said stair step interfaces.

17. The permanent magnet electric machine of claim 16 wherein said unmagnetized skewed areas have a stair step-like shape with clipping.

18. The permanent magnet electric machine of claim 15 wherein a first offset angle of said axial rotor sections is approximately equal to 360 mechanical degrees divided by a least common multiple of a first number of a stator slots of said machine and a second number of rotor poles of said rotor, and divided by a third number of said axial rotor segments.

* * * * *